United States Patent
Huang

(10) Patent No.: US 11,882,417 B2
(45) Date of Patent: Jan. 23, 2024

(54) TRUNCATED CONSTANT BEAM WIDTH ARRAY METHOD

(71) Applicant: The United States of America as represented by the Secretary of the Navy, Newport, RI (US)

(72) Inventor: Dehua Huang, Newport, RI (US)

(73) Assignee: The Government of the United States of America as represented by the Secretary of the Navy

( * ) Notice: Subject to any disclaimer, the term of this patent is extended or adjusted under 35 U.S.C. 154(b) by 176 days.

(21) Appl. No.: 17/721,470

(22) Filed: Apr. 15, 2022

(65) Prior Publication Data

US 2023/0336915 A1    Oct. 19, 2023

(51) Int. Cl.
| | |
|---|---|
| *G10K 11/34* | (2006.01) |
| *H04R 3/12* | (2006.01) |
| *G06F 3/16* | (2006.01) |
| *H04R 1/40* | (2006.01) |
| *G10K 11/26* | (2006.01) |

(52) U.S. Cl.
CPC ............... *H04R 3/12* (2013.01); *G06F 3/165* (2013.01); *G10K 11/26* (2013.01); *G10K 11/34* (2013.01); *H04R 1/403* (2013.01); *H04R 2201/401* (2013.01); *H04R 2203/12* (2013.01)

(58) Field of Classification Search
CPC .. H04S 2400/01; H04S 7/302; H04S 2400/15; H04R 3/12; H04R 2203/12; H04R 5/04; H04R 2430/20; H04R 2430/25; H04R 5/02; G10K 11/26; G10K 11/34

USPC ....................................................... 381/77, 79
See application file for complete search history.

(56) References Cited

U.S. PATENT DOCUMENTS

| | | | | |
|---|---|---|---|---|
| 9,846,235 | B2 * | 12/2017 | Aharoni | G10K 11/34 |
| 11,800,280 | B2 * | 10/2023 | Koschak | H04R 1/406 |
| 2023/0379647 | A1 * | 11/2023 | Bunning | H04S 3/008 |

OTHER PUBLICATIONS

Peter H. Rogers, A.L. Van Buren, New Approach to a Constant Beamwidth Transducer, Journal Article, Jul. 1978, pp. 38-43, vol. 64, No. 1, Journal Acoustic Society, USA.
A.L. Van Buren, L. Dwight Luker, M.D. Jevnager and A.C. Tims, Experimental Constant Beamwidth Transducer, Journal Article, Jun. 1983, pp. 2200-2209, vol. 73, No. 6, Journal.

* cited by examiner

*Primary Examiner* — Disler Paul
(74) *Attorney, Agent, or Firm* — James M. Kasischke; Michael P. Stanley; Jeffry C. Severson

(57) ABSTRACT

A method is given for a broadband constant beam width acoustic array using shading function parameters for a three dimensional axially symmetric beam. Coefficients are calculated for an estimated shading function fitting the parameters that is a summation of Legendre polynomial orders. The number of orders is user specified. Null bearing locations can be determined from the parameters or from the shading function. A constant beam width shading function can be created from these parameters and used as amplifications and attenuations for a conical spherical array of transducers. The array can be truncated at the null bearing locations. The estimated shading function can be further refined by provided additional Legendre polynomial orders.

8 Claims, 7 Drawing Sheets

TRUNCATED CONSTANT BEAM WIDTH ARRAY METHOD

STATEMENT OF GOVERNMENT INTEREST

The invention may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a method for creating an array having a constant beam pattern across a broad frequency range.

(2) Description of the Related Art

Most directional acoustic transducers and arrays have beam patterns which are frequency dependent. The beam width becomes wide when frequency goes low for a plane piston or a line array. As a result, the spectral content of the transmitted or received signals varies with position in the beam, and thus the fidelity of an acoustic system will depend on the relative orientation of the transmitter and receiver. Constant beam width transducers have been studied and tested, where only the beam width, a limited portion of the beam pattern is maintained as constant. Beam width is measured by the half angle at the half power point of the beam pattern's main lobe. In other words, the half power point is the angle where power is down by 3 dB over a certain frequency band.

Prior art constant beam width transducers typically sacrifice management of side lobes and nulls to the goal of providing a constant beam width. Often it is desirable to have a specific beam pattern. In a typical lobed beam pattern having a main lobe and side lobes, it is desirable to steer the main lobe toward a target of interest while placing beam pattern nulls toward noise source directions. The side lobes can also be controlled for suppressing other environmental sounds.

There is a known method for determining a shading function that will give a user specified wideband beam pattern. The known method utilizes a spherical or hemispherical array of transducers with each transducer element having an associated signal. The shading function consists of weightings that are calculated for each transducer in the array as being proportional to the user specified beam pattern. Signal power levels for each transducer are modified by amplification or attenuation in accordance with the shading function. The array can be operated for receiving and transmitting signals with a constant beam width over a broad range of frequencies.

Many sonar applications require less than a 180° beam pattern while still requiring a constant beam pattern over a wide band of frequencies. An array shaded to have a constant beam pattern that uses a Legendre polynomial as a shading function can be truncated to a conical spherical array to reduce the array size and weight. This limits the beam pattern to those that can be obtained using a Legendre polynomial of a specified degree. A low degree Legendre polynomial will give a broad beam width and a high degree Legendre polynomial will give a narrower beam width, and one is limited to the beam pattern given by the selected polynomial.

Thus, it is desirable to provide a method for designing a more compact array that is capable of transmitting and receiving acoustic signals with a user defined shading function that maintains its beam width across a broad range of frequencies.

SUMMARY OF THE INVENTION

It is a first object of the present invention to provide a constant beam width shading function for an acoustic array over a broad range of frequencies.

Another object is to allow an array to be truncated to active portions.

Accordingly, a method is given for a broadband constant beam width acoustic array using shading function parameters for a three dimensional axially symmetric beam. Coefficients are calculated for an estimated shading function fitting the parameters that is a summation of Legendre polynomial orders. The number of orders is user specified. Null bearing locations can be determined from the parameters or from the shading function. A constant beam width shading function can be created from these parameters and used as amplifications and attenuations for a conical spherical array of transducers. The array can be truncated at the null bearing locations. The estimated shading function can be further refined by provided additional Legendre polynomial orders.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
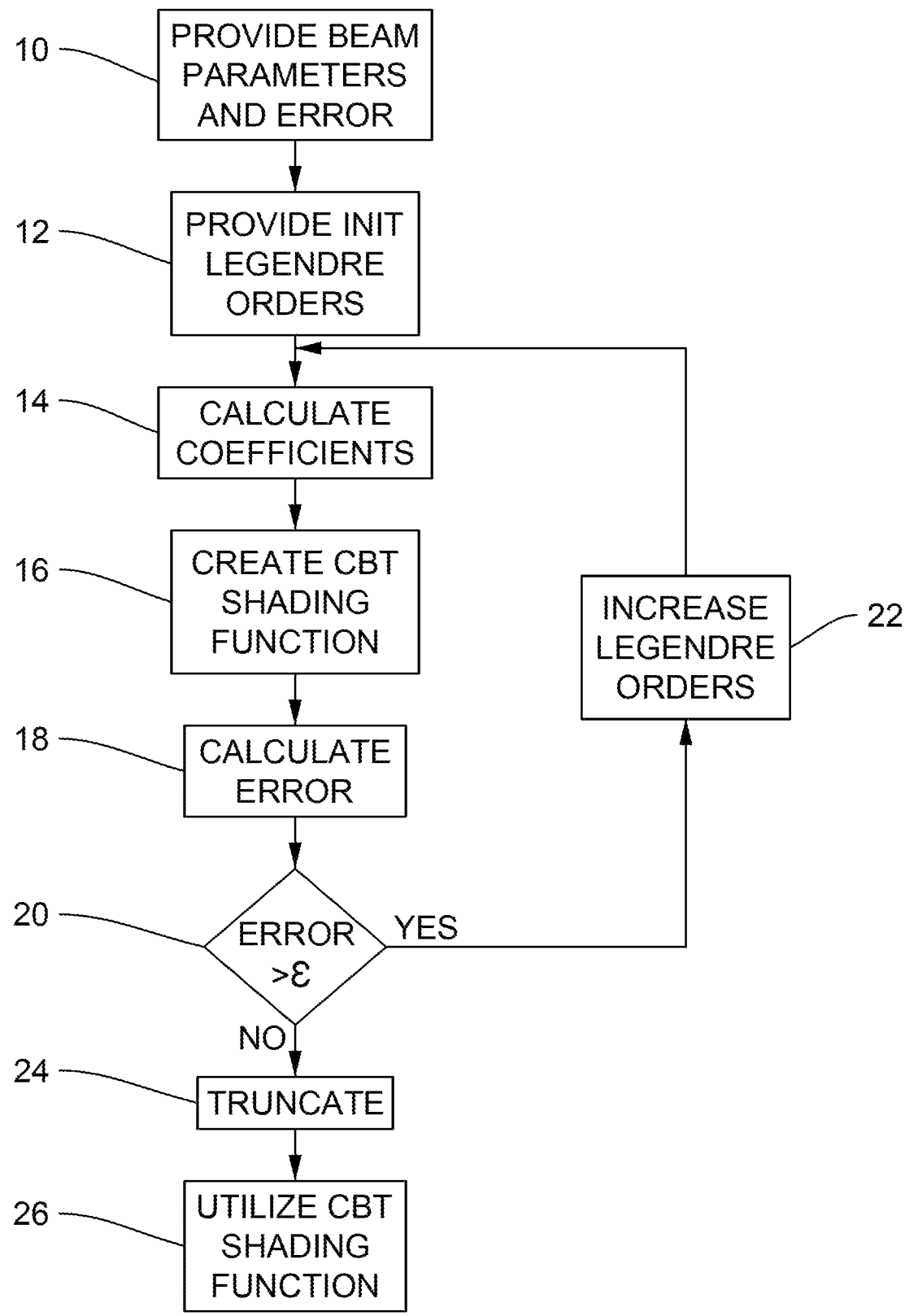
FIG. 1 is a flowchart indicating an embodiment of the method herein.

Disclosed herein is a design method for a truncated broadband constant beam width transducer. Using this method a single shading function can be provided for a broad range of frequencies.

If the radial velocity on the surface of a radius $\alpha$ sphere is equal to $U_0 V(\theta)\exp(-i\omega t)$, where $U_0$ is a constant value to the peak of particle velocity, and $V(\theta)$ is the axially symmetric dimensionless angular radial particle velocity distribution on the surface of the sphere, $\omega$ is the angular frequency, then the general corresponding acoustic pressure outside of the sphere will be:

$$p(R, \theta, t) = e^{-i\omega t}\sum_{v=0}^{\infty} B_v P_v(\cos(\theta)) h_v(kR) \qquad (1)$$

after solving the Helmholtz equation for the axially symmetrical case, here R is the radius from the center of a spherical array and $\theta$ is the conical bearing from an origin, $B_v$ is a coefficient, $h_v$ is first kind spherical Hankel function of v degree, c is the sound speed of the surrounding fluid, and $k=\omega/c$ is the wave number. The boundary condition on the sphere surface is $$\left.\frac{\partial p(R, \theta)}{\partial R}\right|_{R=a} = i\rho\omega U_0 V(\theta); \qquad (2)$$

where $\rho$ is the medium density, $\alpha$ is the radius of the sphere. The angular radial particle velocity distribution $V(\theta)$ can be expanded by the following Legendre polynomials series $P_v(\cos(\theta))$ $$V(\theta) = \sum_{v=0}^{\infty} A_v P_v(\cos\theta) \qquad (3)$$

and the quantities $A_v$, are the coefficients in the Legendre series expansion of $V(\theta)$, and be found in Eq. (4)

$$A_v = \frac{(2v+1)}{2}\int_0^\pi V(\theta) P_v(\cos(\theta))\sin(\theta)d\theta \qquad (4)$$

By utilizing Eq. (2) and Eq. (3) as boundary conditions, Eq. (1) becomes $$p(R, \theta, t) = i\rho c U_0 e^{-i\omega t}\sum_{v=0}^{\infty} A_v P_v(\cos(\theta))\frac{h_v(kR)}{h'_v(ka)} \qquad (5)$$

here $h'_v(x)$ is the derivative of $h_v(x)$, with respect to the argument of x. The acoustic far field beam pattern in logarithmic format is defined as $$BP(\theta) = 20\log_{10}\left|\frac{p(R, \theta)}{[p(R, \theta)]_{max}}\right|_{R\to\infty} \qquad (6)$$

Utilizing Eq. (5), the above equation becomes $$BP(\theta) = 20\log_{10}\left|\frac{\sum_{v=0}^{\infty} A_v P_v(\cos(\theta))\frac{h_v(kR)}{h'_v(ka)}}{\left[\sum_{v=0}^{\infty} A_v P_v(\cos(\theta))\frac{h_v(kR)}{h'_v(ka)}\right]_{max}}\right|_{R\to\infty} \qquad (7)$$

The spherical Hankel function asymptotic forms become, $$\begin{cases} h_v(x)|_{x\to\infty} \approx \left.\frac{e^{i(x-a_v\pi)}}{x}\right|_{x=kR} \\ h'_v(x)|_{x\to\infty} \approx \left.\frac{(ix-1)e^{i(x-a_v\pi)}}{x^2}\right|_{x=ka} \end{cases} \qquad (8)$$

and under the far field conditions $$kR\to\infty, \qquad (9)$$

for $h_v(x)|_{x=kR}$ and $$k\alpha\to\infty, \qquad (10)$$

for $h'_v(x)|_{x=k\alpha}$. To all degrees of v, Legendre polynomials have $$P_v(\cos\theta)|_{Maximum}=1 \qquad (11)$$

when $\theta=0$ is the maximum view direction at main lobe. Applying Eq. (8) and Eq. (11), Eq. (7), becomes $$BP(\theta) \approx 20\log_{10}\left|\frac{\sum_{v=0}^{\infty} A_v P_v(\cos\theta)}{\sum_{v=0}^{\infty} A_v}\right|_{\substack{kR\to\infty \\ ka\to\infty}} = 20\log_{10}\left|\frac{V(\theta)}{\sum_{v=0}^{\infty} A_v}\right|. \qquad (12)$$

The physics behind Eq. (12) is that the far field acoustic beam pattern is the same as the normalized particle velocity (or shading) angular distribution on the surface of a spherical transducer or array, and the beam pattern becomes frequency independent under Hankel asymptotic conditions of Eq. (9) and Eq. (10). To achieve a certain shapes of angular distribution far field beam patterns, the same types of angular excitation (or shading for receivers) on the normal surface of the spherical transducer or array need to be engineered under the asymptotic conditions. The asymptotic condition of Eq. (9) can always be satisfied, because of the definition of far field beam pattern Eq. (6). However, the second asymptotic condition to Hankel function in Eq. (10) may be restrained by physical dimension of the spherical transducer and the operating frequency that $k\alpha$, or $\alpha/\lambda$, becomes an important design parameter for constant beam pattern (CBP) transducer engineering. Here, $\alpha$ is the radius of the spherical transducer or array, and $\lambda$ is the wavelength of the frequency of interest.

Acoustic constant beam pattern (CBP) transducers have a beam pattern that is independent of frequency in a wide frequency band. The theory and numerical simulations for the constant beam pattern transducer design are studied and described. The far-field beam pattern is proportionally the same as the normal directional radial particle velocity distribution, or shading function on the spherical transducer or array surface, under the spherical Hankel function asymptotic approximation conditions.

Any arbitrary shading functions can be expandable by Legendre series, per Sturm-Liouville theory. Classic Dolph-Chebyshev shading of equal side lobes can be achieved by Legendre polynomial expansion for spherical transducers. The narrower the beam width, the higher degree Legendre polynomials that must be involved such that a larger control parameter of $\alpha/\lambda$ may be required, in order to control small ripples to the side lobes for achieving ideal constant beam pattern (CBP) transducers.

Several numerical examples are simulated by the Rayleigh integral method to verify the wave equation beam pattern solution in Eq. (12) under various $\alpha/\lambda$ conditions $$p(x, y, z) = -\frac{i\rho\omega}{2\pi} \int_{s_0} \frac{e^{jkR}}{R} (U_0 V(\theta))\hat{n} \cdot d\vec{S}_0, \quad (13)$$

Where $V(\theta)$ is defined in Eq. (2) as the radial particle velocity distribution in its normal direction with $\hat{n}$ as a unit vector on the surface $S_0(x_0,y_0,z_0)$ for the sphere of radius $\alpha$, and $$R = \sqrt{(x-x_0)^2 + (y-y_0)^2 + (z-z_0)^2}, \quad (14)$$

is the distance between the active surface element and the far field point.

As described in the flowchart of FIG. 1, a user can provide axisymmetric beam parameters to design a sonar array shading function or a sonar array utilizing this method. In step 10, the user selects axisymmetric beam parameters. These parameters can include a peak power level, a beam width and open angle requirements. The beam width is defined as the half-angle where the beam is reduced by 3 dB from its peak power. The peak power is generally at the midpoint of the beam. The open angle is the conical open half angle. This is the half angle between the midpoint of the beam and the desired first null in the beam pattern. Specifying beam width and open angle are most common; however, other angles and power levels can be specified as part of the parameters. If the open angle is not specified, the first null in the beam pattern can be determined by modeling. This step can also include specification of an error term $\varepsilon$ for the fit between the calculated shading function and the user specified shading function. Relative error $\varepsilon$ below 5% has generally been found to be acceptable.

In step 12, the user provides an initial number of Legendre polynomial orders to utilize for creating the shading function. A closer fit to the user specified curve can be achieved utilizing higher order Legendre polynomials. The number of Legendre polynomial orders also can be limited to reduce terms in the expansion. Increasing the number of Legendre polynomial orders increases the accuracy of the fit between the shading function and the user specified parameters; however, calculating fewer orders requires less time and fewer resources.

Utilizing the number of Legendre polynomial orders, coefficients are calculated in step 14 for a summation of Legendre polynomials to provide a curve approximately fitting the user specified parameters. In step 16, the expansion coefficients are normalized and a normalized CBT shading function is reconstructed. Error between the normalized CBT shading function and the user parameters is calculated in step 18. This error is evaluated against the user specified error $\varepsilon$ in step 20. If the error is greater than a user specified threshold the number of Legendre polynomial orders is increased in step 22. After increasing the number of orders, coefficients are recalculated in 14 and the normalized CBT shading function is reconstructed in 16.

Once the normalized CBT shading function is finalized, it can be truncated in step 24 at conical half angles larger than the first null angles specified by the user. Physical truncation can occur in the design phase by not having array transducers facing in angles beyond the first null angles. Electronic truncation can occur by zeroing out signals to transducers facing in angles beyond the first null angles. In step 26, the new shading function can be utilized for gain and attenuation factors for a conical spherical array. Prior to implementation, the broadband far-beam pattern of the array can be evaluated by numerical simulation.

In a first example, the method is utilized to determine a shading function for a conical spherical array having a half-angle beam width ($\theta_{BW}$) of 10° and a conical open half-angle ($\theta_{CorAngle}$) of 20° over a domain of 0°≤θ≤90°. This beam pattern can be defined mathematically by the following equation:

$$V(\theta) = \begin{cases} 1 + \frac{(0.707-1)}{\theta_{BW}}\theta & |\theta| \leq \theta_{BW} \\ 0.707 - \frac{0.707}{(\theta_{CorAngle} - \theta_{BW})}(\theta - \theta_{BW}) & \theta_{BW} < |\theta| \leq \theta_{CorAngle} \\ 0 & \text{Others} \end{cases} \quad (15)$$

Figure 2:
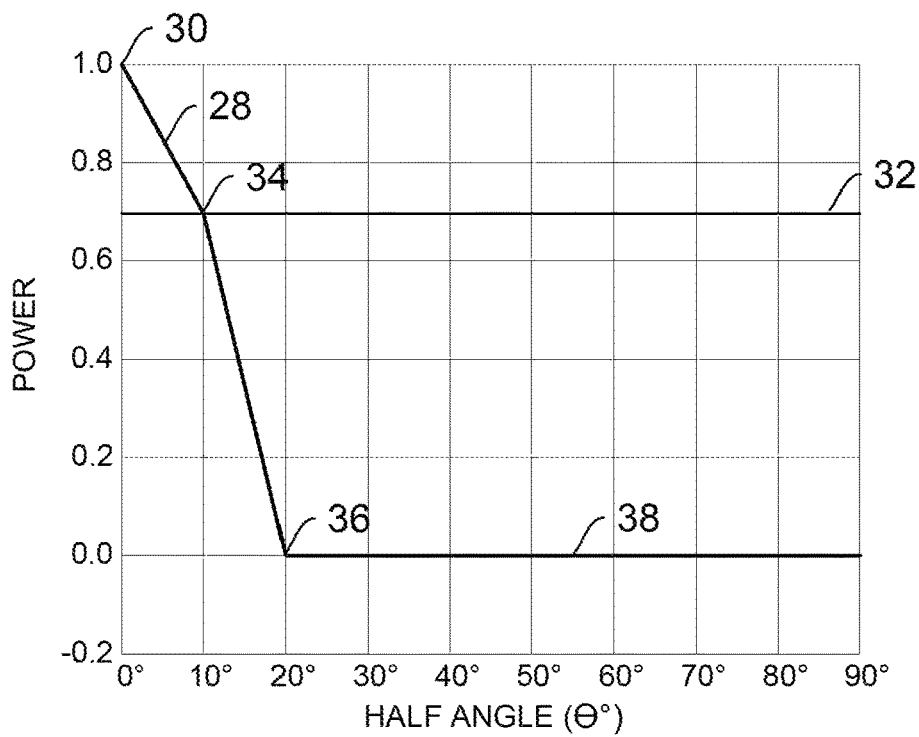
FIG. 2 is a graph showing user defined shading function parameters for a first example.

The user specified beam pattern $V(\theta)$ is shown as 28 on the graph in FIG. 2. A peak beam level 30 is provided at 0°. Peak beam level 30 is normalized to a power of 1.0. Line 32 at a normalized power level of 0.707 indicates the half power level or −3 dB line. The user defined beam width is indicated at 34. The conical open half angle ($\theta_{CorAngle}$) is indicated at 36 to be designed as the first null from the peak of the main lobe in the far-field beam pattern. Portion 38 of shading function is set to zero.

Figure 3A:
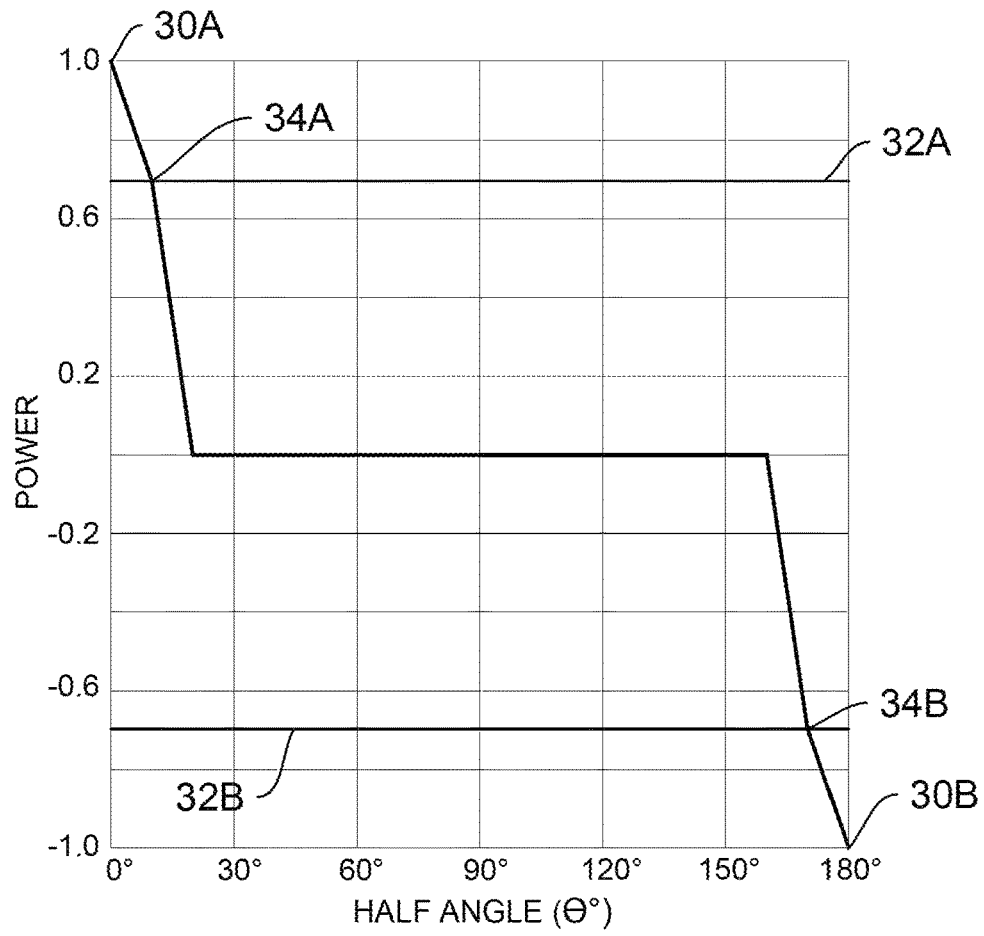
FIG. 3A is a graph of user defined shading function parameters extended as an odd function for the first example.
Figure 3B:
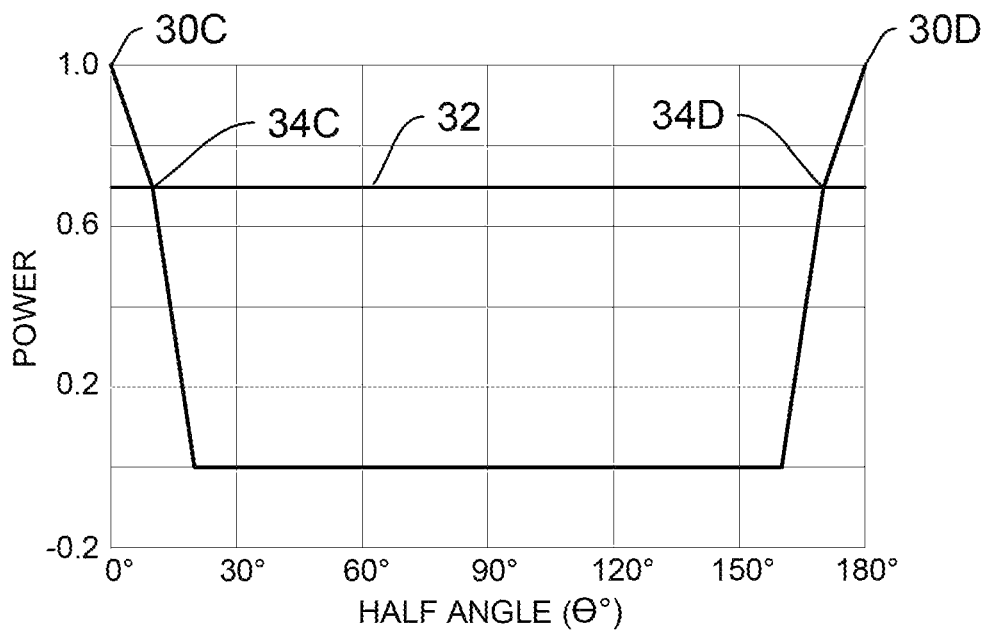
FIG. 3B is a graph of user defined shading function parameters extended as an even function for the first example.

Over a full spherical domain of 0°≤θ≤180°, the user specified beam pattern must be modeled as either an odd function or an even function about θ°=90°, and one must consider the negative portions of the Legendre polynomials. FIG. 3A shows modeling as an odd function, and FIG. 3B shows modeling as an even function. In FIG. 3A, the user specified shading function is reflected and flipped to produce an odd 180° shading function. Peak 30 appears as positive peak 30A and negative peak 30B. Half power line 32 is given as a positive half power 32A and a negative half power 32B. Beam width 34 shows as positive beam width 34A and negative beam width 34B. In FIG. 3B, the shading function is mirrored to produce an even 180° shading function. Peak 30 appears as first peak 30C and second peak 30D. Beam width 34 is indicated at first beam width 34C and second beam width 34D.

Odd orders in a Legendre polynomial expansion following equations (3) and (4) are as follows:

$$V_{\pi\_Odd} = \sum_{v=0}^{\infty} A_v P_v(\cos\theta) \quad (16)$$

and $$A_v = \begin{cases} \dfrac{(2v+1)}{2} \int_0^\pi V(\theta)P_v(\cos(\theta))\sin(\theta)d\theta, & v = 1, 3, 5, 7\ldots \\ 0, & v = 0, 2, 4, 6\ldots \end{cases} \quad (17)$$

Due to a property of Legendre polynomials, the $A_v$ coefficients are zero when the order is even.

Figure 4:
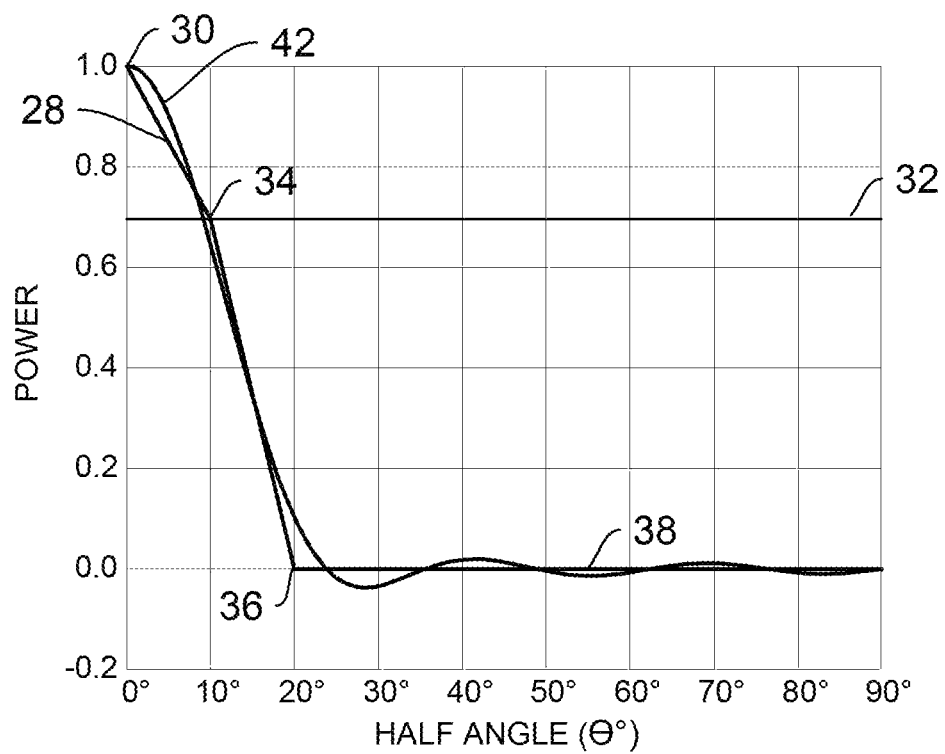
FIG. 4 is a graph showing the user defined shading function and the estimated shading function for the first example.

FIG. 4 shows the user specified shading function 28 of FIG. 2 compared with a shading function 42 developed by this method utilizing the first six odd orders (v=1,3,5,7,9,11) of Legendre polynomials. Solving equation (17) gives the estimated equation as:

$$V_{CBT}(\theta)=0.351P_1(\cos\theta)+0.743P_3(\cos\theta)+0.972P_5(\cos\theta)+1.0P_7(\cos\theta)+0.843P_9(\cos\theta)+0.562P_{11}(\cos\theta). \quad (18)$$

Figure 5:
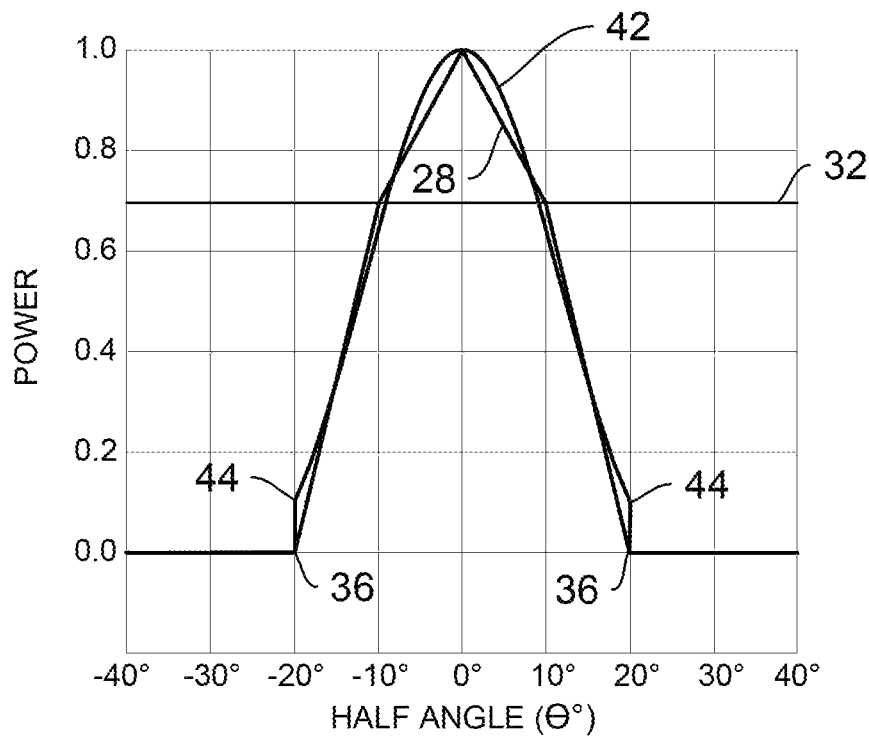
FIG. 5 is a graph showing the user defined shading function and the truncated estimated shading function for the first example.

FIG. 5 shows the user specified shading function 28 reflected about the 0° line with the computed shading function 42. At 44, the computed shading function 42 has been truncated at the first nulls 36 of the user specified function 40. Relative error calculated between the computing shading function 42 and the user specified function 40 is 3.737%. Because 3.737% is below the customary user specified error ε=5%, utilization of higher order Legendre polynomials is not necessary.

A shading function can be developed by this method utilizing the first seven even orders (v=0, 2, 4, 6, 8, 10, 12) of Legendre polynomials. Solving using these orders gives the estimated equation as:

$$V_{CBT}(\theta)=0.118P_0(\cos\theta)+0.557P_2(\cos\theta)+0.872P_4(\cos\theta)+1.0P_6(\cos\theta)+0.931P_8(\cos\theta)+0.705P_{10}(\cos\theta)+0.397P_{12}(\cos\theta).$$

Relative error between this and the user defined shading patterns is about 4.186%, but it is noted that this utilizes an additional Legendre polynomial order.

Figure 6:
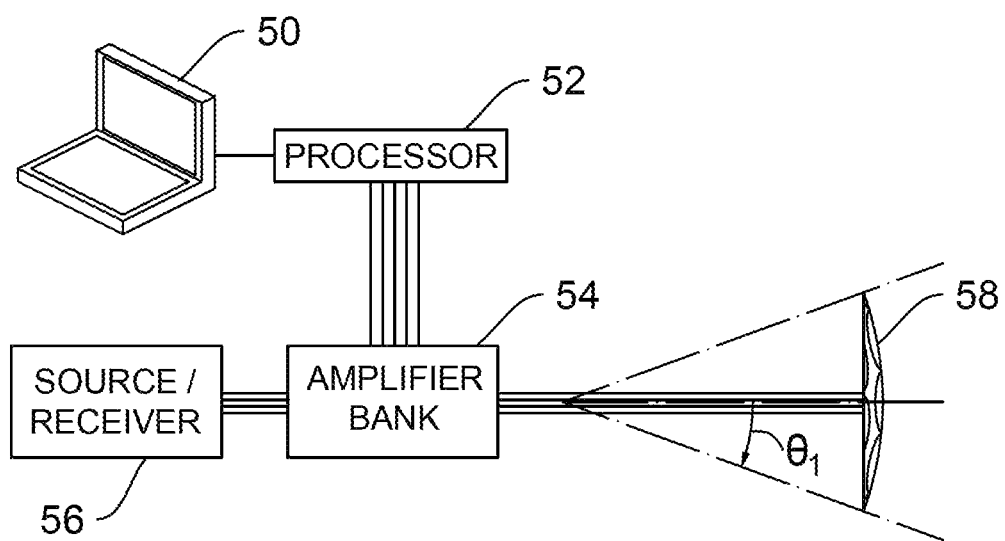
FIG. 6 is a diagram of apparatus for practicing the first example of the method.

FIG. 6 is a diagram showing apparatus for utilizing example 1. A user can specify beam parameters, the number of Legendre polynomial orders, and the error term at a terminal 50. Terminal 50 can calculate the shading function, $V_{CBT}(\theta)$ as described above. The shading function can be provided to a processor 52 for conversion into gains or attenuations. These gains or attenuations are provided to individual amplifiers in an amplifier bank 54. Amplifier bank 54 receives a signal from a signal source 56 and provides amplified signals to an array of transducers 58. Array 58 is a spherical conical array having a plurality of transducers. One or more transducers are oriented to provide acoustic output at a range of conical angles. Array 58 is truncated to the first null angle $\theta_1$=20°.

Figure 7:
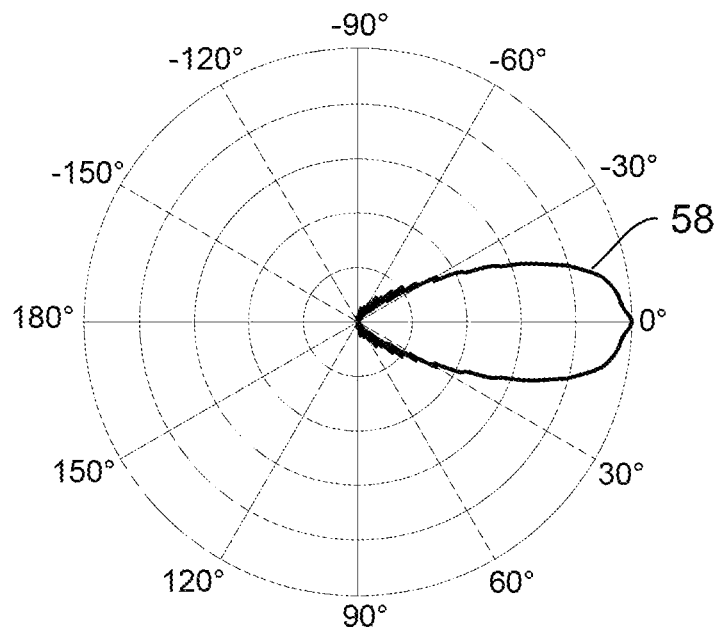
FIG. 7 is a modeled beam pattern for the first example.

FIG. 7 shows a modeled beam pattern 60 for an array such as that shown in FIG. 6 utilizing the calculated shading function, $V_{CBT}(\theta)$. The modeled beam pattern is a far-field beam pattern with a 20 kHz input for the conical spherical array 58 having a radius of 0.94 meters. Each magnitude line represents a 10 dB variation. Modeling at 20-400 kHz input frequency provides substantially the same beam pattern, showing the broadband nature of this design.

Figure 8:
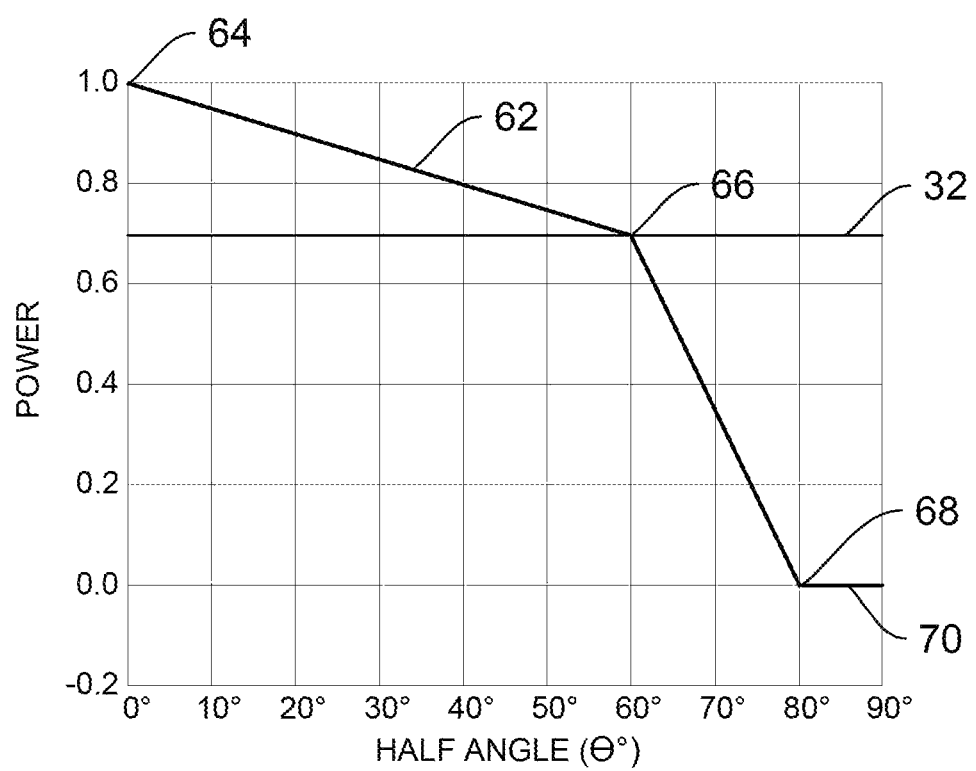
FIG. 8 is a graph showing user defined shading function parameters for a second example.

In a second example, the method is utilized to determine a shading function for a conical spherical array having a half-angle beam width ($\theta_{BW}$) of 60° and a conical open half angle ($\theta_{CorAngle}$) of 80° over a domain of 0°≤θ°≤90°. The user specified shading function V(θ) is shown as 62 on the graph in FIG. 8. A peak beam level 64 is provided at 0°. Peak beam level is normalized to a power of 1.0. As with example 1, line 32 indicates the half power level or −3 dB line. The user defined beam width is indicated at 66. The conical open half angle ($\theta_{CorAngle}$) is indicated at 68. Portion 70 of shading function at angles greater than $\theta_{CorAngle}$ is set to zero.

The user specified shading function was extended as described above to 180°. $V_{CBT}(\theta)$ was calculated as in equations (16) and (17) utilizing the first six odd orders of Legendre polynomials as described above. This results in a shading function:

$$V_{CBT}(\theta)=1.0P_1(\cos\theta)-0.93P_3(\cos\theta)-0.111P_5(\cos\theta)+0.235P_7(\cos\theta)-0.182P_9(\cos\theta)+0.95P_{11}(\cos\theta). \quad (20)$$

Figure 9:
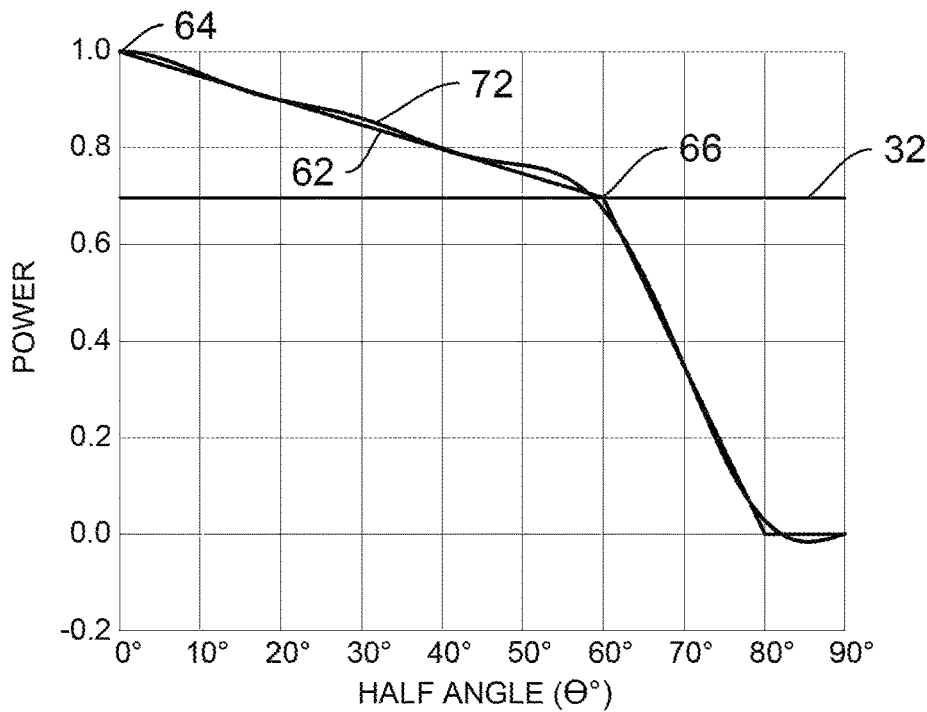
FIG. 9 is a graph showing the user defined shading function and the estimated shading function for the second example.
Figure 10:
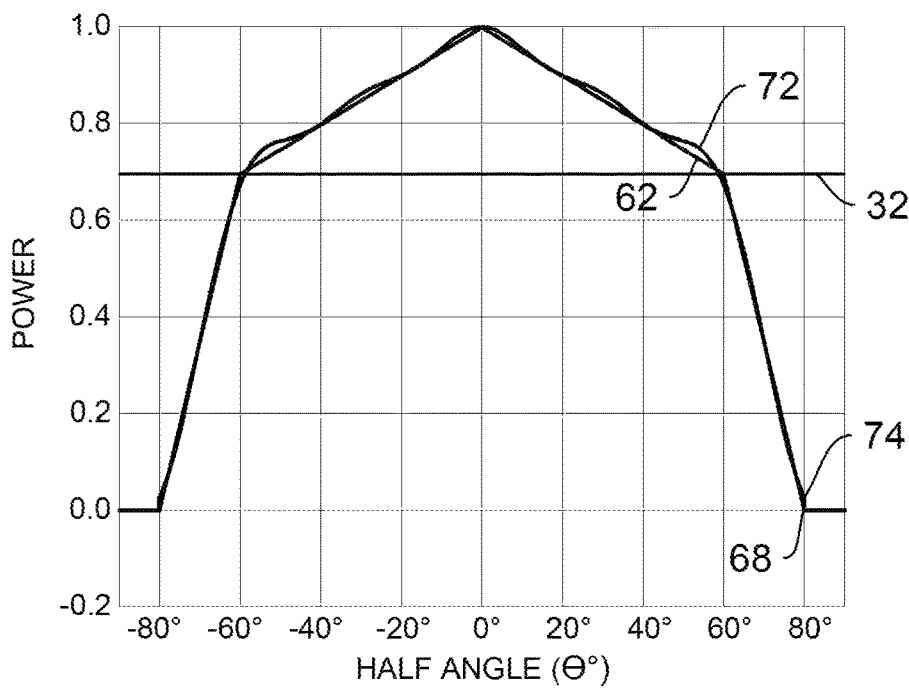
FIG. 10 is a graph showing the user defined shading function and the truncated estimated shading function for the second example.

FIG. 9 shows a comparison of the calculated shading function $V_{CBT}(\theta)$ in equation (20) represented by curve 72 against the user specified beam pattern V(θ) 62. FIG. 10 shows the user specified shading function 62 reflected about the 0° line with the computed shading function 72. At 74, the computed shading function 72 has been truncated at the first nulls 68 of the user specified function 62.

Figure 11:
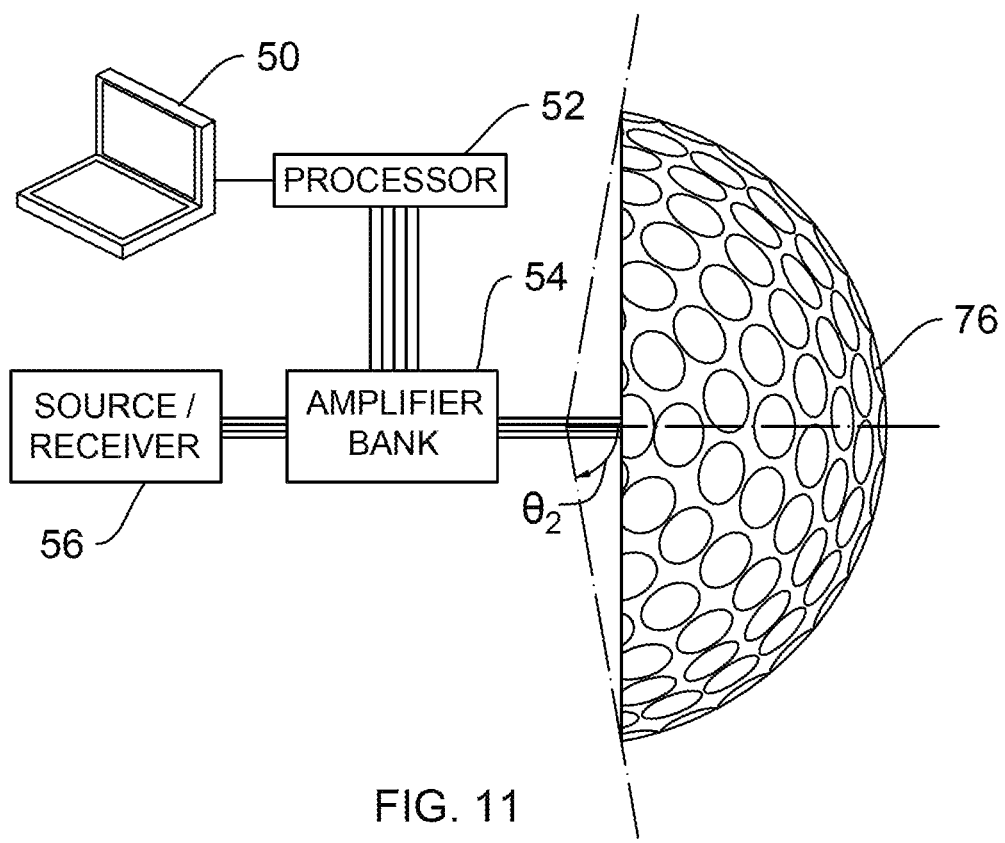
FIG. 11 is a diagram of apparatus for practicing the second example of the method.

FIG. 11 shows apparatus utilizing example 2. As above, the user can specify a shading function at a terminal 50. The shading function can be processed into gains and attenuations by processor 52. These gains and attenuations are provided to amplifier bank 54 for use in amplifying signals to and from source/receiver 56. Array of transducers 76 is a spherical conical array of a plurality of transducers. One or more of the transducers is oriented in a conical angle. Amplifier bank 54 amplifies signals associated with the transducers oriented in a conical angle in accordance with the calculated shading function, $V_{CBT}(\theta)$. Array 76 is truncated at a conical angle of $\theta_2$=80°. Truncation can be physical, as shown, or by zeroing the signal to the transducers associated with angles greater than $\theta_2$.

Figure 12:
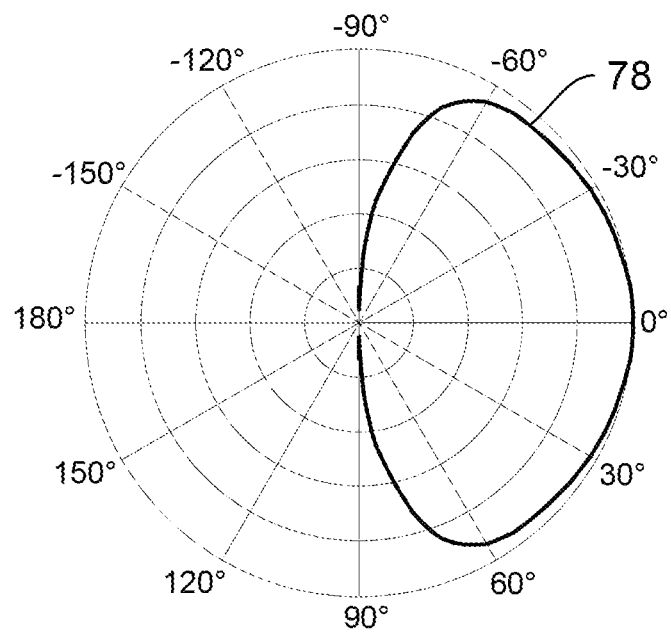
FIG. 12 is a modeled beam pattern for the second example.

FIG. 12 shows a modeled beam pattern 78 for an array such as that of FIG. 11 utilizing the calculated shading function, $V_{CBT}(\theta)$. The modeled beam pattern is a far-field beam pattern with a 20 kHz input for the conical spherical array 76 having a radius of 0.94 meters. Each magnitude line represents a 10 dB variation. Modeling at 20-400 kHz input frequency provides substantially the same beam pattern, showing the broadband nature of this design.

Additional methods can be utilized to specify the shading function such as by providing additional angles and power levels. Error can be specified based on a modeled beam pattern rather than being based on the shading function. The array can be a banded array with a single transducer band being oriented at a conical angle. In view of this, it will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A method for providing a broadband constant beam width acoustic array:

receiving user specified shading function parameters for a three dimensional axially symmetric beam;
obtaining a user specified peak power level;
providing an initial number of Legendre polynomial orders;
calculating coefficients for a summation of Legendre polynomial orders that fit the user specified shading function parameters;
determining an axisymmetric null bearing location from the user specified shading function parameters;
creating a constant beam width transducer shading function as a function of axisymmetric bearing as a summation of Legendre polynomial orders with the calculated coefficients, peak power level, and the determined axisymmetric null bearing locations;
providing an array of transducers in a conical spherical configuration with each transducer having an associated bearing and an associated signal; and
modifying a power level of the signal associated with each transducer of the array in accordance with the created constant beam width transducer shading function.

2. The method of claim 1, further comprising the steps of:

defining an error value for the created constant beam width transducer shading function;
calculating an error between the created constant beam width transducer shading function and the user specified shading function parameters;
determining if the calculated error exceeds the defined error value;
increasing the number of Legendre polynomial orders if the calculated error exceeds the defined error value; and
repeating the steps of calculating coefficients, and creating a constant beam width transducer shading function with the increased number of Legendre polynomial orders if the calculated error exceeds the defined error value.

3. The method of claim 1, wherein the user specified parameters are half power beam width half-angle and first null half-angle, said determined axisymmetric null bearing location being the first null half-angle.

4. The method of claim 1, wherein the constant beam width transducer shading function eliminates signals associated with transducers having an associated bearing greater than the determined axisymmetric null bearing locations.

5. The method of claim 1, wherein the provided array of transducers is limited by the determined axisymmetric null bearing locations.

6. The method of claim 1, wherein:

receiving user specified shading function parameters comprises receiving user specified shading function parameters over a range of 0° to 90°; and
further comprising the step of:
expanding the user specified shading function to a range of 0° to 180° by replicating the user specified shading function for the range of 90° to 180°.

7. The method of claim 6, wherein:

expanding the user specified shading function replicates the shading function as an odd function; and
calculating coefficients for a summation of Legendre polynomial orders utilizes odd orders of Legendre polynomials and sets coefficients for even orders of Legendre polynomials to zero.

8. The method of claim 6, wherein:

expanding the user specified shading function replicates the shading function as an even function; and
calculating coefficients for a summation of Legendre polynomial orders utilizes even orders of Legendre polynomials and sets coefficients for odd orders of Legendre polynomials to zero.

* * * * *